(12) United States Patent
Kent et al.

(10) Patent No.: US 7,961,775 B2
(45) Date of Patent: *Jun. 14, 2011

(54) METHOD AND SYSTEM FOR A DELTA QUANTIZER FOR MIMO PRE-CODERS WITH FINITE RATE CHANNEL STATE INFORMATION FEEDBACK

(75) Inventors: Mark Kent, Vista, CA (US); Vinko Erceg, Cardiff, CA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 928 days.

This patent is subject to a terminal disclaimer.

(21) Appl. No.: 11/767,108

(22) Filed: Jun. 22, 2007

(65) Prior Publication Data

US 2008/0165869 A1 Jul. 10, 2008

Related U.S. Application Data

(60) Provisional application No. 60/884,118, filed on Jan. 9, 2007.

(51) Int. Cl.
H04L 27/30 (2006.01)
(52) U.S. Cl. ............... 375/146; 375/267; 375/299
(58) Field of Classification Search ........... 375/141, 375/144, 146–148, 220, 221, 267, 285, 295, 375/299, 340, 347, 349
See application file for complete search history.

(56) References Cited

U.S. PATENT DOCUMENTS

| | | | | |
|---|---|---|---|---|
| 7,676,007 B1 * | 3/2010 | Choi et al. | ..................... | 375/347 |
| 2006/0155533 A1 * | 7/2006 | Lin et al. | ........................ | 704/223 |
| 2007/0174038 A1 * | 7/2007 | Wang et al. | ........................ | 704/1 |
| 2008/0080634 A1 * | 4/2008 | Kotecha et al. | ................ | 375/267 |
| 2008/0112504 A1 * | 5/2008 | Jiang et al. | ..................... | 375/296 |
| 2008/0159425 A1 * | 7/2008 | Khojastepour et al. | ........ | 375/260 |
| 2008/0165868 A1 * | 7/2008 | Kent et al. | ..................... | 375/260 |
| 2008/0192717 A1 * | 8/2008 | Kent et al. | ..................... | 370/342 |
| 2008/0192852 A1 * | 8/2008 | Kent et al. | ..................... | 375/262 |
| 2009/0252240 A1 * | 10/2009 | Kwon et al. | .................. | 375/260 |

* cited by examiner

Primary Examiner — Dac V Ha
(74) Attorney, Agent, or Firm — McAndrews, Held & Malloy, Ltd

(57) ABSTRACT

Aspects of a method and system for a delta quantizer for MIMO pre-coders with finite rate channel state information feedback may comprise quantizing a change in channel state information in a MIMO pre-coding system onto at least a first and a second codebook, each of which comprises one or more unitary matrices, using a cost function; and generating the at least first and second codebook based on at least the channel state information. The channel state information may be a matrix V and the cost function may be defined by the following relationship:

$$f(A) = \left(\frac{1}{N}\sum_{j=1}^{N}|a_{j,j}|^2\right)$$

where A is a matrix of size N by N and $a_{ij}$ is element (i,j) of matrix A. One or more unitary matrices may be generated for the at least first codebook from at least a first set of matrices and a second set of matrices.

118 Claims, 7 Drawing Sheets

METHOD AND SYSTEM FOR A DELTA QUANTIZER FOR MIMO PRE-CODERS WITH FINITE RATE CHANNEL STATE INFORMATION FEEDBACK

CROSS-REFERENCE TO RELATED APPLICATIONS/INCORPORATION BY REFERENCE

This application makes reference to, claims priority to, and claims the benefit of U.S. Provisional Application Ser. No. 60/884,118, filed on Jan. 9, 2007.

This application also makes reference to:
U.S. application Ser. No. 60/884133, filed on Jan. 9, 2007;
U.S. application Ser. No. 60/884113, filed on Jan. 9, 2007;
U.S. application Ser. No. 60/884132, filed on Jan. 9, 2007;
U.S. application Ser. No. 11/767,071, filed on even date herewith;
U.S. application Ser. No. 11/767,123, filed on even date herewith; and
U.S. application Ser. No. 11/767,158, filed on even date herewith.

Each of the above referenced applications is hereby incorporated herein by reference in its entirety.

FIELD OF THE INVENTION

Certain embodiments of the invention relate to signal processing for communication systems. More specifically, certain embodiments of the invention relate to a method and system for a delta quantizer for MIMO pre-coders with finite rate channel state information feedback.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M-1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some work on multiple antenna systems may be focused on systems that support single user point-to-point links, other work may focus on multiuser scenarios. Communication systems that employ multiple antennas may greatly improve the system capacity.

In order to maximize the performance of MIMO systems, information about the wireless channel, so-called channel state information (CSI), may be required at the transmitter. This may allow the transmitter to adapt the transmission signal such that the channel may be maximally exploited. In most cases, the transmitter may learn about the channel only through information that is being fed back from the receiver to the transmitter. This is primarily the case because many modern communication systems employ frequency division duplex (FDD). In a FDD system, the uplink and downlink transmissions use different, separated frequency bands. Due to the separation in frequency, channel measurements taken in either the uplink or the downlink band may not generally be useful or applicable to the other frequency band. Therefore, for example in a cellular downlink, the base station transmitter may need to learn about the transmission channel through measurements obtained at the mobile terminal that may then be fed back to the base station. With an increasing number of antennas, the information that may need to be fed back from the receiver to the transmitter may become significant and represent a non-negligible overhead. Especially in the downlink, where the channel measurements may be obtained at a mobile terminal and the data rates are quite limited, the feedback requirements may become onerous.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a delta quantizer for MIMO pre-coders with finite rate channel state information feedback, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a delta quantizer for MIMO pre-coders with finite rate channel state information feedback. Aspects of the invention may comprise quantizing a change in channel state information in a MIMO pre-coding system onto at least a first and a second codebook, each of which comprises one or more unitary matrices, using a cost function. At least a first and a second codebook may be generated based on the channel state information. The channel state information may be a matrix V and the cost function may be defined by the following relationship:

$$f(A) = \left(\frac{1}{N}\sum_{j=1}^{N}|a_{jj}|^2\right)$$

where A is a matrix of size N by N and $a_{ij}$ is element (i,j) of matrix A. One or more unitary matrices may be generated for the at least first codebook from at least a first set of matrices and a second set of matrices, whereby the first set of matrices may be generated from one or more Givens matrices and the dynamic range of the at least first codebook may be modified by a step size.

The resolution of the at least first codebook may be modified by adjusting the codebook cardinality. This may be achieved by modifying a set of angular levels. From the at least second codebook, Voronoi regions may be generated for the unitary matrices of the at least second codebook. Based on the Voronoi regions and the one or more unitary matrices, a set of matrices may be generated. This set of matrices may be modified into a set of unitary matrices that may become the at least second codebook, thereby updating the at least second codebook. An index of an element of each of the at least first and second codebook onto which the change in channel state information may be quantized may be transmitted from a receiver to a transmitter in the MIMO pre-coding system. The matrix V may be generated using Singular Value Decomposition (SVD) or Geometric Mean Decomposition (GMD). A matrix at a transmitter of the MIMO pre-coding system may be linearly transformed with a combination of a plurality of the unitary matrices.

Figure 1A:
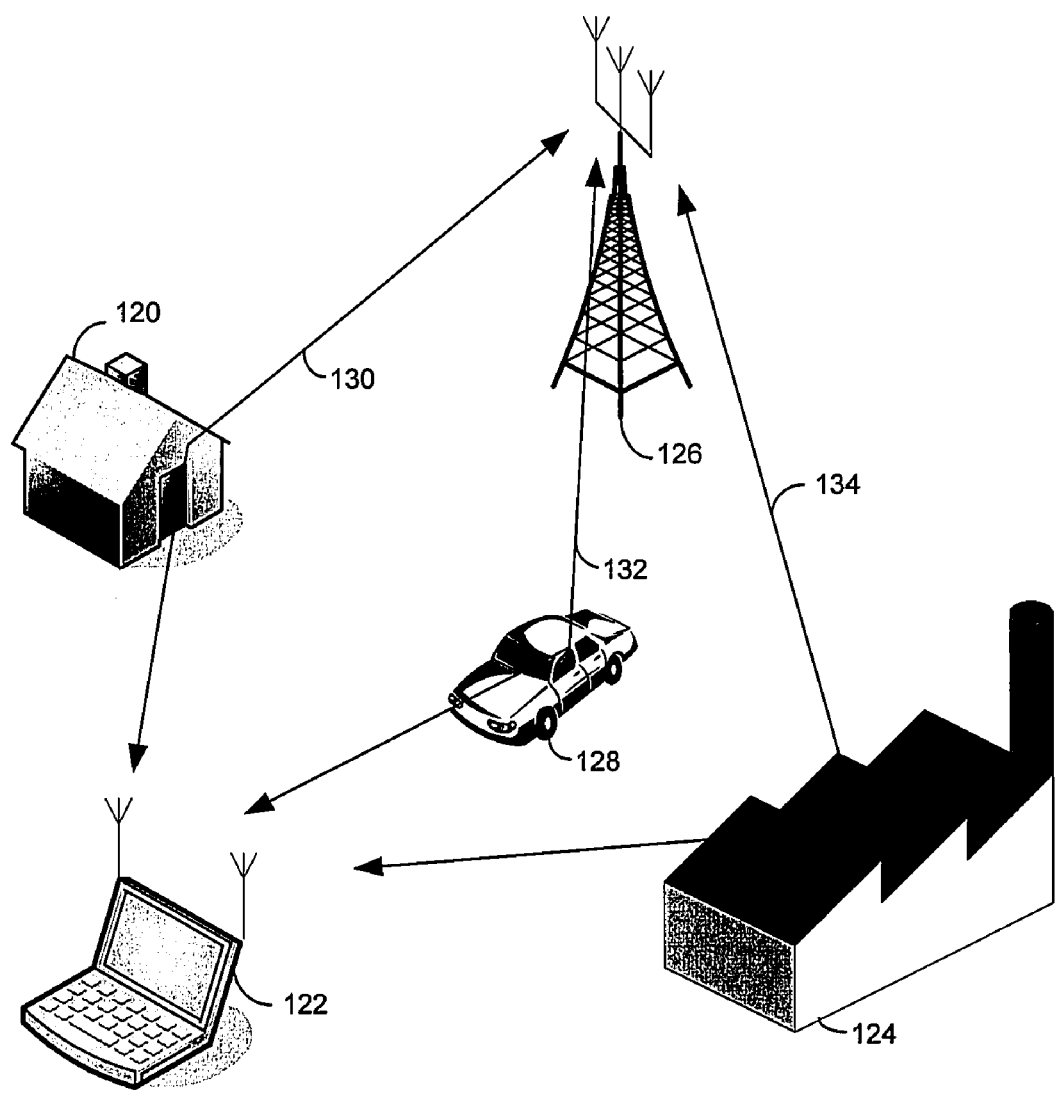
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals. Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
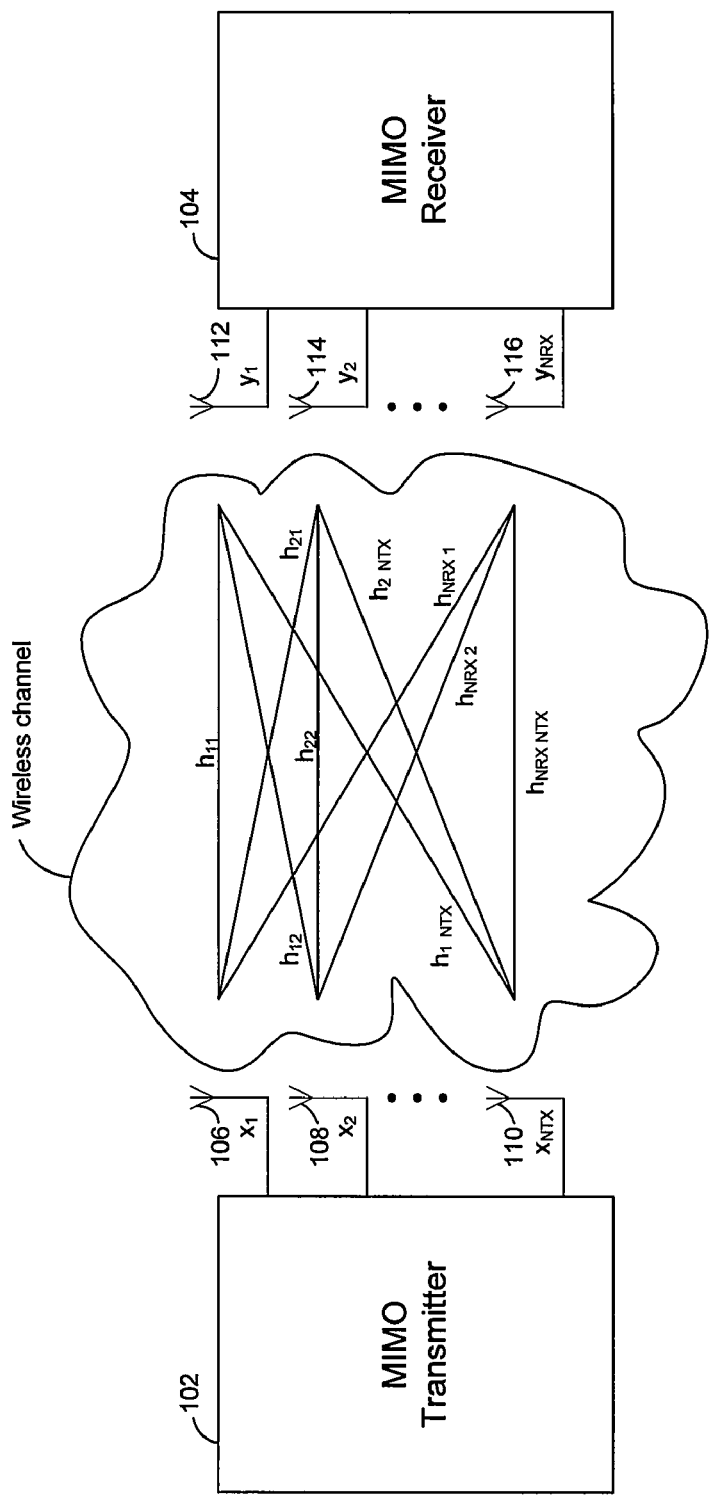
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{Tx}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$ i ∈ $\{1,2, \ldots N_{TX}\}$ that may be transmitted by the transmit antennas, of which the antennas 106, 108 and 110 may be depicted in FIG. 1B. The MIMO receiver 104 may comprise suitable logic, circuitry and/or code that may be enabled to process the receive symbols $y_i$ i ∈ $\{1,2, \ldots N_{RX}\}$ that may be received by the receive antennas, of which the antennas 112, 114 and 116 may be shown in FIG. 1B. An input-output relationship between the transmitted and the received signal in a MIMO system may be written as:

$$y = Hx + n$$

where $y = [y_1, y_2, \ldots y_{NRX}]^T$ may be a column vector with $N_{RX}$ elements, $^T$ may denote a vector transpose, $H = [h_{ij}]$: i ∈ $\{1, 2, \ldots N_{RX}\}$; j ∈ $\{1,2, \ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements. The channel matrix H may be written, for example, as $H = U\Sigma V^H$ using the Singular Value Decomposition (SVD), where $^H$ denotes the Hermitian transpose, U is a $N_{RX}$ by $N_{TX}$ unitary matrix, $\Sigma$ is a $N_{TX}$ by $N_{TX}$ diagonal matrix and V is $N_{TX}$ by $N_{TX}$ unitary matrix. Other matrix decompositions that may diagonalize or transform the matrix H may be used instead of the SVD. If the receiver algorithm implemented in MIMO receiver 104 is, for example, an Ordered Successive Interference Cancellation (OSIC), other matrix decompositions that convert the matrix H to lower/upper triangular may be appropriate. One such decomposition may comprise Geometric Mean Decomposition (GMD), where $H = QRP^H$, where R may be upper triangular with the geometric mean of the singular values of H on the diagonal elements, and Q and P may be unitary.

Figure 2:
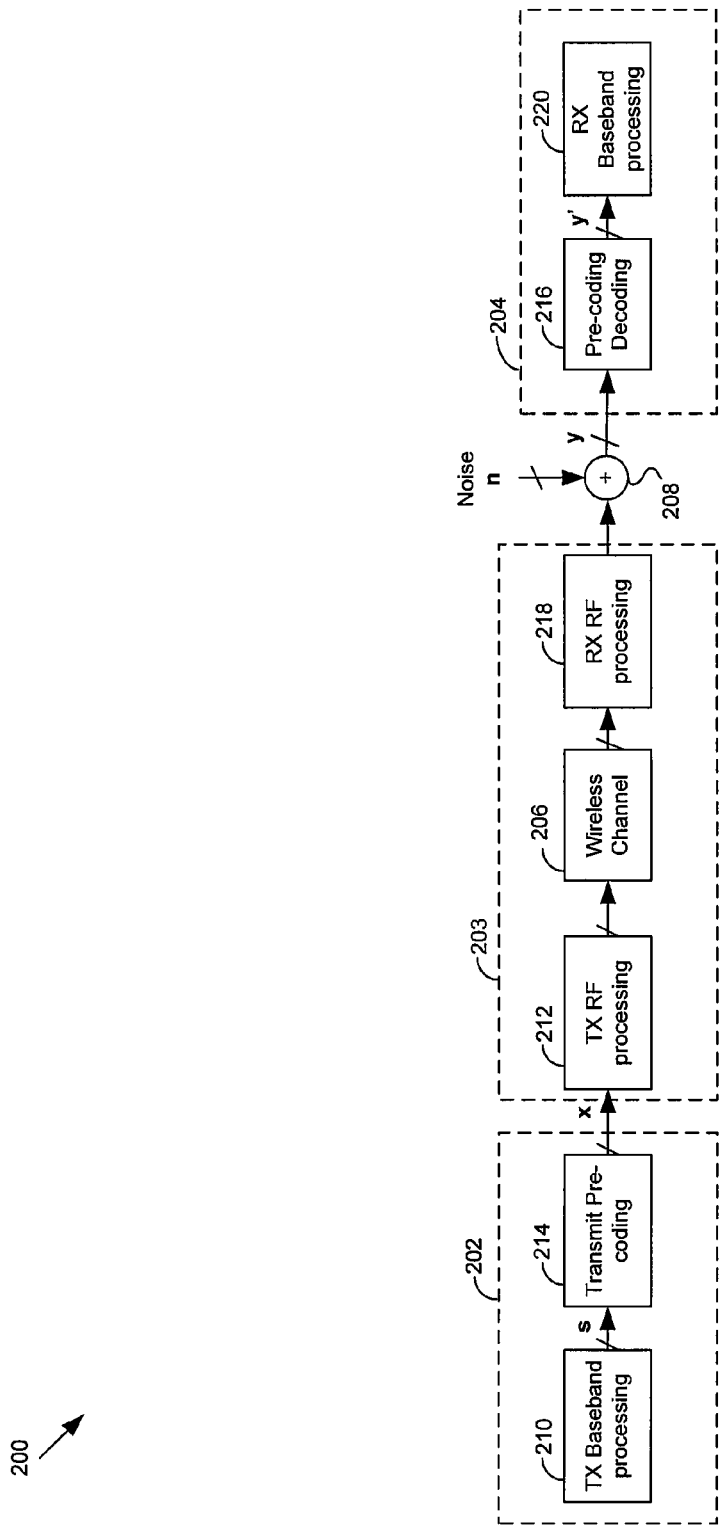
FIG. 2 is a block diagram illustrating an exemplary MIMO pre-coding transceiver chain model, in accordance with an embodiment of the invention.

FIG. 2 is a block diagram illustrating an exemplary MIMO pre-coding transceiver chain model, in accordance with an embodiment of the invention. Referring to FIG. 2, there is shown a MIMO pre-coding system 200 comprising a MIMO transmitter 202, a MIMO baseband equivalent channel 203, a MIMO receiver 204, and an adder 208. The MIMO transmitter 202 may comprise a transmitter (TX) baseband processing block 210 and a transmit pre-coding block 214. The MIMO baseband equivalent channel 203 may comprise a wireless channel 206, a TX radio frequency (RF) processing block 212 and a receiver (RX) RF processing block 218. The MIMO receiver 204 may comprise a pre-coding decoding block 216 and a RX baseband processing block 220. There is also shown symbol vector s, pre-coded vector x, noise vector n, received vector y and channel-decoded vector y'.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214. A baseband signal may be suitably coded for transmission over a wireless channel 206 in the transmit pre-coding block 214 that may comprise suitable logic, circuitry and/or code that may enable it to perform these functions. The TX RF processing block 212 may comprise suitable logic, circuitry and/or code that may enable a signal communicated to the TX RF processing block 212 to be modulated to radio frequency (RF) for transmission over the wireless channel 206. The RX RF processing block 218 may comprise suitable logic, circuitry and/or code that may be enabled to perform radio frequency front-end functionality to receive the signal transmitted over the wireless channel 206. The RX RF processing block 218 may comprise suitable logic, circuitry and/or code that may enable the demodulation of its input signals to baseband. The adder 208 may depict the addition of noise to the received signal at the MIMO receiver 204. The MIMO receiver 204 may comprise the pre-coding decoding block 216 that may linearly decode a received signal and communicate it to the RX baseband processing block 220. The RX baseband processing block 220 may comprise suitable logic, circuitry and/or logic that may enable to apply further signal processing to baseband signal.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214 and may be the symbol vector s. The symbol vector s may be of dimension $N_{TX}$ by 1.

The transmit pre-coding block 214 may be enabled to apply a linear transformation to the symbol vector s, so that $x = Ws_1$, where W may be of dimension $N_{TX}$ by length of s, and $x = [x_1, x_2, \ldots x_{NTX}]^T$. Each element of the pre-coded vector x may be transmitted on a different antenna among $N_{TX}$ available antennas.

The transmitted pre-coded vector x may traverse the MIMO baseband equivalent channel 203. From the $N_{RX}$ receiver antennas, the received signal y may be the signal x transformed by the MIMO baseband equivalent channel 203 represented by a matrix H, plus a noise component given by the noise vector n. As depicted by the adder 208, the received vector y may be given by $y = Hx + n = HWs + n$. The received vector y may be communicated to the pre-coding decoding block 216, where a linear decoding operation B may be applied to the received vector y to obtain the decoded vector $y' = B^H y = B^H HWs + B^H n$, where B may be a complex matrix of appropriate dimensions. The decoded vector y' may then be communicated to the RX baseband processing block 220 where further signal processing may be applied to the output of the pre-coding decoding block 216.

If the transfer function H of the MIMO baseband equivalent channel 203 that may be applied to the transmitted pre-coded vector x is known both at the MIMO transmitter 202 and the MIMO receiver 204, the channel may be diagonalized by, for example, setting W=V and B=U, where $H = U\Sigma V^H$ may be the singular value decomposition. In these instances, the channel decoded vector y' may be given by the following relationship:

$$y' = U^H U \Sigma V^H V s + U^H n = \Sigma s + U^H n$$

Since $\Sigma$ may be a diagonal matrix, there may be no interference between the elements of symbol vector s in y' and hence the wireless communications system may appear like a system with up to $N_{TX}$ parallel single antenna wireless communication systems, for each element of s, up to the rank of channel matrix H which may be less or equal to $N_{TX}$.

Figure 3:
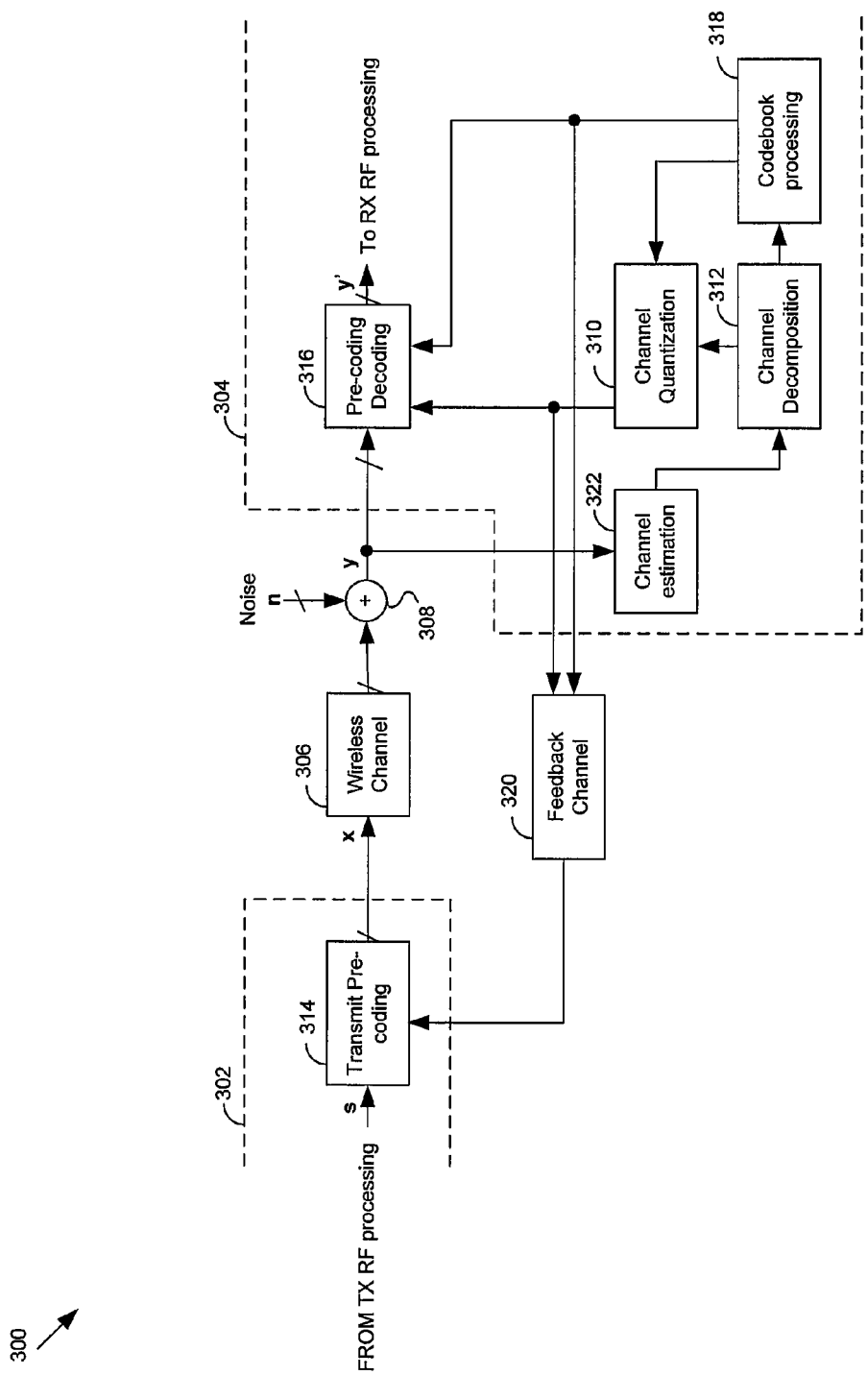
FIG. 3 is a block diagram of an exemplary MIMO pre-coding system with finite rate channel state information feedback, in accordance with an embodiment of the invention.

FIG. 3 is a block diagram of an exemplary MIMO pre-coding system with finite rate channel state information feedback, in accordance with an embodiment of the invention. Referring to FIG. 3, there is shown a MIMO pre-coding system 300 comprising a partial MIMO transmitter 302, a partial MIMO receiver 304, a Wireless channel 306, an adder 308, and a feedback channel 320. The partial MIMO transmitter 302 may comprise a transmit pre-coding block 314. The partial MIMO receiver 304 may comprise a pre-coding decoding block 316, a channel estimation block 322, a channel quantization block 310, a channel decomposition block 312, and a codebook processing block 318. There is also shown a symbol vector s, a pre-coded vector x, a noise vector n, a received vector y, and a decoded vector y'.

The transmit pre-coding block 314, the wireless channel 306, the adder 308 and the pre-coding decoding block 316 may be substantially similar to the transmit pre-coding block 214, the MIMO baseband equivalent channel 203, the adder 208 and the pre-coding decoding block 216, illustrated in FIG. 2. The channel estimation block 322 may comprise suitable logic, circuitry and/or logic to estimate the transfer function of the wireless channel 206. The channel estimate may be communicated to the channel decomposition block 312 that may be enabled by suitable logic, circuitry and/or code, to decompose the channel. In this respect, the decomposed channel may be communicated to the channel quantization block 310. The channel quantization block 310 may comprise suitable logic, circuitry and/or logic to partly quantize the channel onto a codebook. The codebook processing block 318 may comprise suitable logic, circuitry and/or logic that may be enabled to generate a codebook. The feedback channel 320 may represent a channel that may be enabled to carry channel state information from the partial MIMO receiver 304 to the partial MIMO transmitter 302.

In many wireless systems, the channel state information, that is, knowledge of the channel transfer matrix H, may not be available at the transmitter and the receiver. However, in order to utilize a pre-coding system as illustrated in FIG. 2, it may be desirable to have at least partial channel knowledge available at the transmitter. In the exemplary embodiment of the invention disclosed in FIG. 2, the MIMO transmitter 302 may require the unitary matrix V for pre-coding in the transmit pre-coding block 214 of MIMO transmitter 202.

In frequency division duplex (FDD) systems, the frequency band for communications from the base station to the mobile terminal, downlink communications, may be different from the frequency band in the reverse direction, uplink communications. Because of a difference in frequency bands, a channel measurement in the uplink may not generally be useful for the downlink and vice versa. In these instances, the measurements may only be made at the receiver and channel state information (CSI) may be communicated back to the transmitter via feedback. For this reason, the CSI may be fed back to the transmit pre-coding block 314 of the partial MIMO transmitter 302 from the partial MIMO receiver 304 via the feedback channel 320. The transmit pre-coding block 314, the wireless channel 306, and the adder 308 are substantially similar to the corresponding blocks 214, 203 and 208, illustrated in FIG. 2.

At the partial MIMO receiver 304, the received signal y may be used to estimate the channel transfer function H by $\hat{H}$ in the channel estimation block 322. The estimate may further be decomposed into, for example, a diagonal or triangular form, depending on a particular receiver implementation, as explained for FIG. 2. For example, the channel decomposition block 312 may perform an SVD: $\hat{H}=\hat{U}\hat{\Sigma}\hat{V}^H$. The matrix H and $\hat{H}$ may be a rank $r=N_{RX}$ matrices. This may be the case when the number of receive antennas is smaller than the number of transmit antennas, that is $N_{RX} \leq N_{TX}$. In the case of a plurality of antennas, the dimensions of the matrices U, Σ and V may grow quickly. In these instances, it may be desirable to quantize the matrix $\hat{V}$ into a matrix $V_k$ of dimensions $N_{TX}$ by $N_{RX}$, where $V_k$ may be given by the following relationship:

$$V_k = \sqrt{1-\alpha^2} \cdot V_{k-1} \cdot Q_q^0 + \alpha \cdot U_{k-1} \cdot P_m^0$$

and may be generated from the previous instance of $V_k$, that is $V_{k-1}$, unitary rotation matrices $Q_q^0$ and $P_m^0$ from pre-defined finite sets of unitary matrices $C_d=\{Q_i\}$ and $C_p=\{P_i\}$, respectively. α may be a multiplicative factor. The matrix $U_{k-1}$ may be unitary and orthonormal to $V_{k-1}$, such that $U_{k-1}^H V_{k-1}=0$. The dimensions of $U_{k-1}$ may be $N_{TX}$ by ($N_{TX}$-r). Many solutions for $U_{k-1}$ may be found. The matrix $U_{k-1}$ may be deterministically constructed from matrix $V_{k-1}$. By using a deterministic method to construct $U_{k-1}$, $U_{k-1}$ may be constructed from a given matrix $V_{k-1}$. This may allow the construction, for example, at the transmitter without having to feed back the matrix $U_{k-1}$ explicitly.

One may, for example, construct $U_{k-1}=[u_1, u_2, \ldots, u_{NTX-NRX}]$ by using Givens reflections, where the first column vector $u_1$ of $U_{k-1}$ may be the first non-zero column vector of matrix $(I-V_{k-1} \cdot V_{k-1}^H)$, which may be normalized to unit norm, that is $u_1^H u_1=1$. The $(j+1)^{th}$ column vector of $U_{k-1}$ may be chosen to be the first non-zero column vector of matrix $$\left( I - V_{k-1} \cdot V_{k-1}^H - \sum_{i=1}^{j} u_i \cdot u_i^H \right),$$

which may be normalized to unit-norm. The construction may iteratively continue until the full matrix $U_{k-1}$ may have been generated.

The sets of unitary matrices $C_d$ and $C_p$ may be referred to as codebooks. The matrix $\hat{V}$ may change relatively slowly with respect to the channel update rate. In these instances, it may be more economical to send an update to the previously quantized matrix $V_{k-1}$ instead of a new matrix $V_k$ and utilize channel memory. By finding a matrix $Q_q^0$ and a matrix $P_m^0$ that may generate a $V_k$ that may be, in some sense, closest to the matrix $\hat{V}$, it may suffice to transmit the indices q and m of the matrix $Q_q^0$ and $P_m^0$ to the transmit pre-coding block 314. This may be achieved via the feedback channel 320 from the channel quantization block 310. The partial MIMO transmitter 302 may need to know the codebooks $C_d$ and $C_p$. The codebooks $C_d$ and $C_p$ may be varying much slower than the channel transfer function H and it may suffice to periodically update the codebook $C_d$ and $C_p$ in the transmit pre-coding block 314 from the codebook processing block 318 via the feedback channel 320. The codebooks $C_d$ and $C_p$ may be chosen to be static or adaptive. Furthermore, the codebooks $C_d$ and $C_p$ may also be chosen, adaptively or non-adaptively, from a set of codebooks, which may comprise adaptively and/or statically designed codebooks. In these instances, the partial MIMO receiver 304 may inform the partial MIMO transmitter 302 of the codebooks in use at any given instant in time. The matrix $\hat{V}$ may be quantized into $V_k$ as described by the following relationships:

$$V_k^0(Q_q^0, P_m^0) =$$

$$\arg\max_{X:Q_q\in C_d, P_m\in C_p} f(\hat{V}^H X \mid X = (1-\alpha^2)^{1/2} \cdot V_{k-1} \cdot Q_q + \alpha \cdot U_{k-1} \cdot P_m)$$

$$f(A) = \left(\frac{1}{N}\sum_{j=1}^{N}|a_{jj}|^2\right)$$

where $A=[a_{ij}]$ and A may be of dimensions N by N. Hence, the matrices $Q_q^0$ and $P_m^0$, may be chosen from the codebooks $C_d$ and $C_p$, such that they may maximize the function $f(\hat{V}^H X)$ as defined above. The function f(.) may average the squared absolute value of the diagonal elements of its input matrix. By maximizing f(.), the matrix $V_q$ may be chosen so that the product $\hat{V}^H X$ may be most like an identity matrix, in some sense. The expression for f(.) above may maximize the instantaneous capacity of the pre-coded MIMO system under some approximations. Hence, the channel H may be estimated in the channel estimation block 322 and decomposed in the channel decomposition block 312.

In the channel quantization block 310, a matrix, for example $\hat{V}$, may be quantized into a matrix $V_k = \sqrt{1-\alpha^2}\cdot V_{k-1}\cdot Q_q^0 + \alpha\cdot U_{k-1}\cdot P_m^0$ and the indices q and m may be fed back to the partial MIMO transmitter 302 via the feedback channel 320. Less frequently than the indices q and m, the codebook $C_d$ and $C_p$ from the codebook processing block 318 may be transmitted to the partial MIMO transmitter 302 via the feedback channel 320. The codebooks $C_d$ and $C_p$ may also be chosen time invariant. Furthermore, the codebooks $C_d$ and $C_p$ may also be chosen, adaptively or non-adaptively, from a set of codebooks, which may comprise adaptively and/or statically designed codebooks. To feedback the index q, M bits may suffice when the cardinality |C| of the codebook $C_d$ may be less or equal to $|C_d|\leq 2^M$. N bits may suffice to feed back the index m when the cardinality of $C_p$ may be less or equal to $|C_p|\leq 2^N$. A total of M+N bits may be fed back to transmit both indices, q and m.

The transmit pre-coding block 314 may perform, for example, the linear transformation $x=V_k^0 s$. The pre-coding decoding block 316 at the receiver may implement the linear transformation $y'=\hat{U}^H y$.

A codebook $C_d$ may comprise complex unitary matrices $\{Q_q\}$. A desirable codebook may be one that comprises an easily adjustable dynamic range. This may be interpreted for rotation matrices $\{Q_q\}$ to mean that the absolute range of angles over which the set $C_d$ may rotate may be adaptable or configurable, as may the granularity, that is, the step size between neighboring matrices $Q_q$. Adaptability of the dynamic range may allow the codebook to be adapted to a wide variety of different channel conditions. In particular, the codebook $C_d$ may be adapted to the rate of change of the wireless channel matrix H.

One exemplary protocol to construct a codebook $C_d$ may make use of the unitary property of the matrices $\{Q_q\}$. A square complex unitary matrix $Q_q$ may be constructed from a plurality of diagonal matrices $D_i$ and a plurality of Givens matrices $G_{k,l}$. The matrices $\{Q_q\}$ may be given by the following relationship:

$$Q_q = \prod_{i=1}^{N_{TX}-1}\left[D_i(\phi_{i,i},\ldots,\phi_{N_{TX}-1,i})\prod_{k=i+1}^{N_{TX}}G_{k,i}(\varphi_{k,i})\right] \quad (1)$$

where the matrices $D_i$ may be of the structure given in the following relationship:

$$D_i(\phi_{i,i},\ldots,\phi_{N_{TX}-1,i}) = \begin{bmatrix} I_{i-1} & 0 & 0 & \ldots & 0 \\ 0 & e^{j\phi_{i,i}} & 0 & \ldots & 0 \\ 0 & 0 & \ldots & 0 & 0 \\ 0 & 0 & 0 & e^{j\phi_{N_{TX}-1,i}} & 0 \\ 0 & 0 & 0 & 0 & 1 \end{bmatrix}$$

where the angles $\phi_{k,i}$ and the index i may define the structure of $D_i$. $I_k=I_k$ may denote an identity matrix of dimensions k by k. The indices k and i and the angle $\phi_{k,i}$ may determine the matrices $G_{k,i}$ as shown in the following relationship:

$$G_{k,i}(\varphi_{k,i}) = \begin{bmatrix} I_{k-1} & 0 & 0 & \ldots & 0 \\ 0 & \cos\varphi_{k,i} & 0 & \sin\varphi_{k,i} & 0 \\ 0 & 0 & I_{i-k-1} & 0 & 0 \\ 0 & -\sin\varphi_{k,i} & 0 & \cos\varphi_{k,i} & 0 \\ 0 & 0 & 0 & 0 & I_{N_{TX}-i} \end{bmatrix}$$

The angular range in which the aforementioned angles vary may be: $\phi_{k,i}\in[-\pi/2,\pi/2]$ and $\phi_{k,i}\in[-\pi,\pi]$. In the case where a given $Q_q$ may be an identity matrix, no rotation may take place. Hence, the matrices $\{Q_q\}$ may be close, in some sense, to an identity matrix. A codebook $C_d$ may be constructed as shown in the following relationship:

$$C_d = \{Q_q(\phi_{k,i},\phi_{k-1,i}; \forall 1\leq i\leq k\leq N_{TX}-1)|\phi_{k,i}=\pm m\delta\cdot\pi/2, \phi_{k,i}=\pm n\delta\cdot\pi\}m,n\in\{0,1,2,\ldots N_d\} \quad (2)$$

where $\delta\leq 1/N_d$ may be the step size. In some cases, the values for m and n may be chosen to not assume the value 0. A codebook $C_d$ may be constructed from a set of matrices $\{Q_q\}$ that may be generated from a number of angles according to equation (1). In an embodiment of the codebook, a set $C_d$ may be constructed that may comprise the matrices $\{Q_q\}$ that may be constructed from possible combinations of the set of angles $\phi_{k,i}=\pm m\delta\cdot\pi/2\phi_{k,i}=\pm n\delta\cdot\pi$ as defined in equation (2) and equation (1). From equation (1), it may be seen that the set of $Q_q$ matrices may be defined by $N_{TX}^2-N_{TX}$ angles $\phi_{k,i}$ and $\phi_{k,i}$. Due to the construction of the codebook in equation (2), each angle may take $2N_d+1$ different values. Combining possible angle combinations in $\{Q_q\}$ with possible values that may be assumed by the angles, may lead to a codebook with cardinality $|C_d|=(2N_d+1)^{(N_{TX}^2-N_{TX})}$, that is, $|C_d|$ different matrices $Q_q$ may be comprised in the set $C_d$. In these instances, $B=(N_{TX}^2-N_{TX})\log_2(2N_d+1)$ bits may be fed back from the partial MIMO receiver 304 to the partial MIMO transmitter 302, to feed back the index q of the choice of matrix $Q_q^0$.

For the exemplary case of $N_d=2$, the feedback rate may be 2 bits per channel update for index q. The step size $\delta\leq 1/N_d$ may permit to adjust the dynamic range of the matrices $\{Q_q\}$, whereby a wide range of time-varying fading channels matrices H for different rates of change may be accommodated by the above codebook construction.

Figure 4:
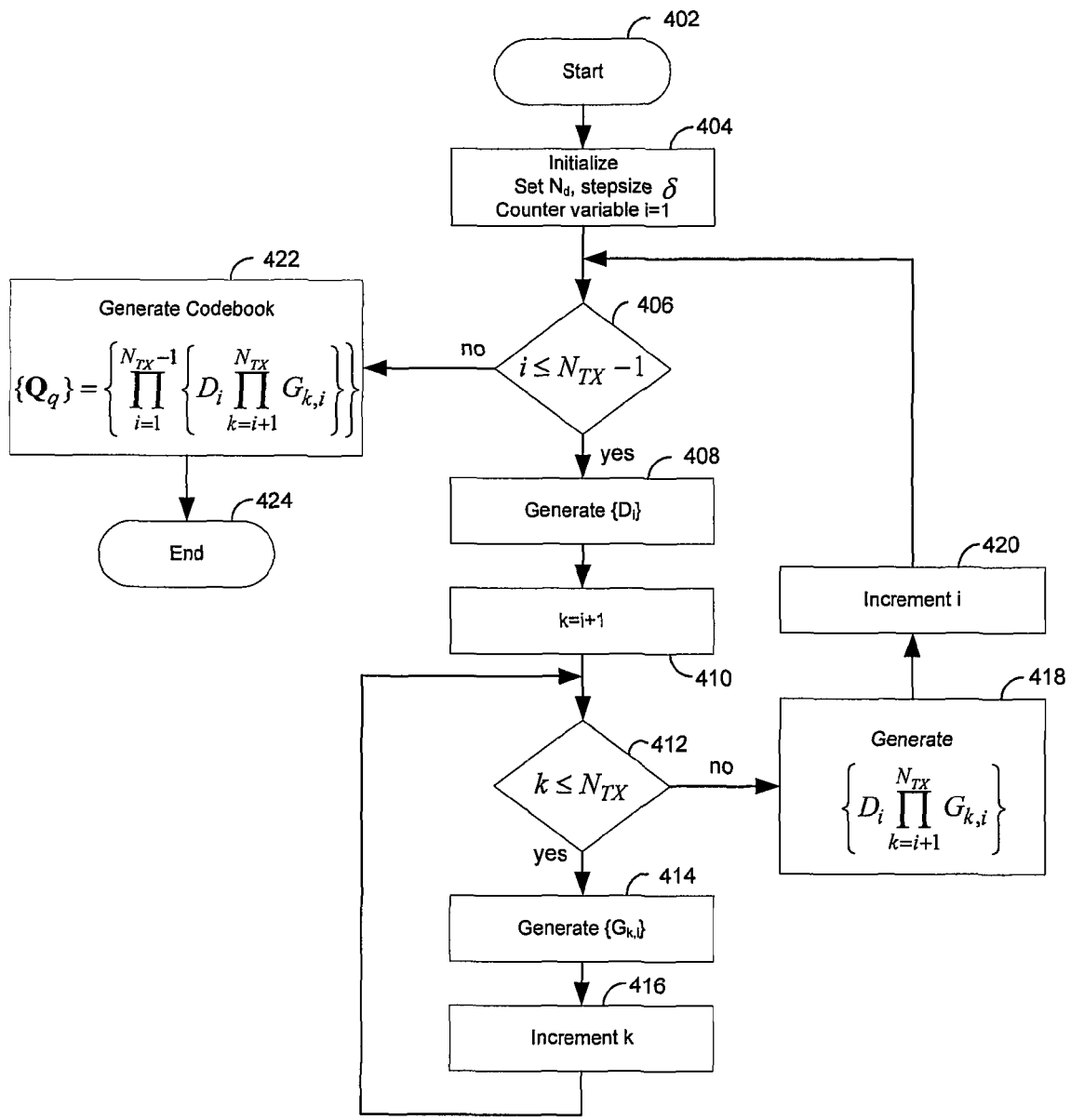
FIG. 4 is a flow chart illustrating an exemplary implementation of a $C_d$ codebook generation algorithm, in accordance with an embodiment of the invention.

FIG. 4 is a flow chart illustrating an exemplary implementation of a $C_d$ codebook generation algorithm, in accordance with an embodiment of the invention. Referring to FIG. 4, there is shown a start step 402, an end step 424, process steps 404, 408, 410, 414, 416, 418, 420 and 422, and decision steps 406 and 412.

An exemplary codebook generation may be started in step 402. In step 404, variables may be initialized, for example, the step size $\delta$, the number of angular levels $N_d$, and a counter variable i=1 that may be substantially similar to the index i in equation (1). In step 406, the variable i may be compared to a threshold value determined by the number of transmit antennas $N_{TX}$. If the variable i is less than $N_{TX}-1$, the process may generate a set of matrices $\{D_i\}$. This set $\{D_i\}$ may be generated from matrices $D_i$ that may be constructed as described above, that is, from different combination of values for the angles $\phi_{k,i}, \ldots, \phi_{N_{TX}-1}, \phi_{k,i} = \pm m\delta \cdot \pi/2$ that may be chosen in the range $\phi_{k,i} \in [-\pi/2, \pi/2]$, as described above. In step 410, a counter variable k may be set as a function of i. The variable k may be substantially similar to the variable k in equation (1). In step 412, the variable k may be compared to a threshold determined by $N_{TX}$. If k is less than $N_{TX}$, the set of matrices $\{G_{k,i}\}$ may be generated. This may be achieved by generating matrices $G_{k,i}$, using different values for $\phi_{k,i} = \pm n\delta \cdot \pi$, where the angular range may be defined as described above by $\phi_{k,i} \in [-\pi, \pi]$. In step 416, the variable k may be incremented, and the algorithm may loop back to step 412. If the variable k exceeds $N_{TX}$ in step 412, process step 418 may be executed. In step 418, the generated sets $\{D_i\}$ and $\{G_{k,i}\}$ may be combined to form a new set $Y_i$ given by the following relationship:

$$Y_i = \left\{ D_i(\phi_{i,i}, \ldots, \phi_{N_{TX}-1,i}) \prod_{k=i+1}^{N_{TX}} G_{k,i}(\varphi_{k,i}) \right\}$$

according to equation (1). The variable i may be incremented in step 420 and the algorithm may loop back to step 406. If the variable i exceeds $N_{TX}-1$ in step 406, the step 422 may be executed. In step 422, the codebook $C_d = \{Q_q\}$ may be generated from the generated sets $Y_i$, according to equation (1). This may complete the codebook generation in the end step 424.

Figure 5:
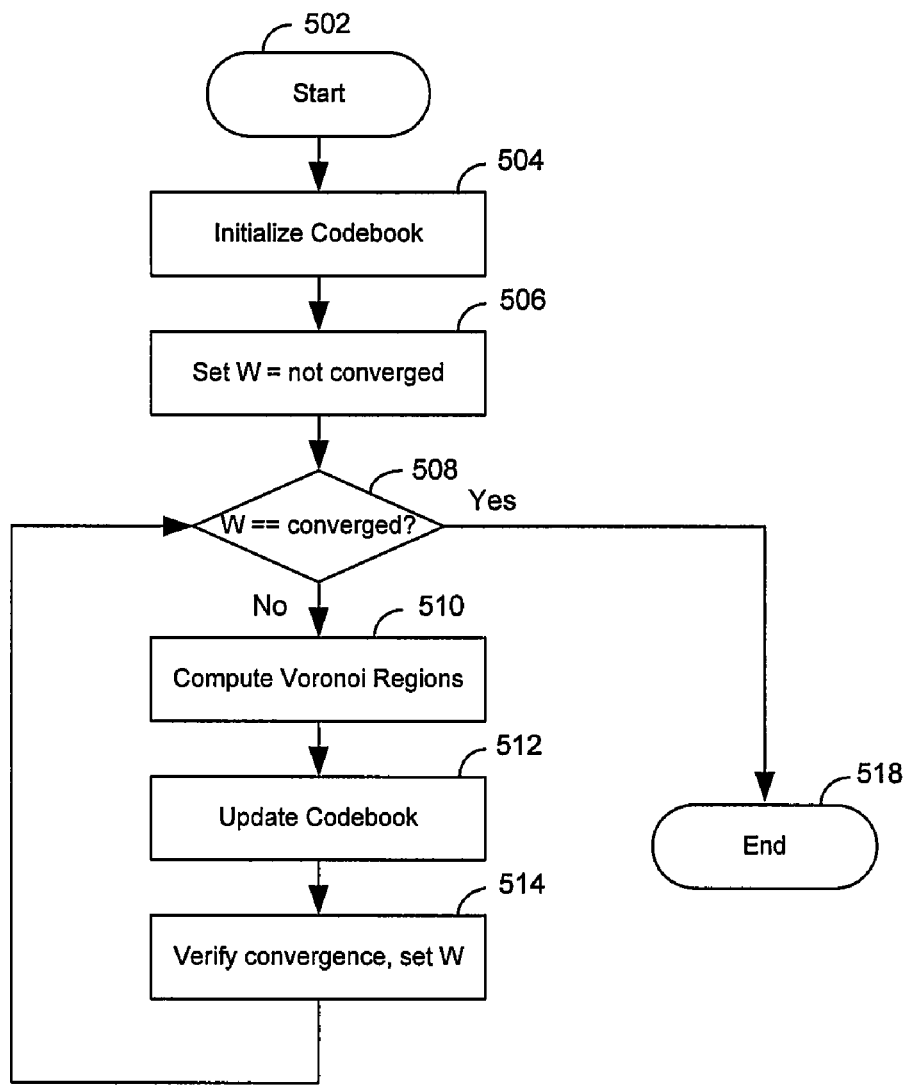
FIG. 5 is a flow chart illustrating an exemplary implementation of a $C_p$ codebook generation algorithm, in accordance with an embodiment of the invention.

FIG. 5 is a flow chart illustrating an exemplary implementation of a $C_p$ codebook generation algorithm, in accordance with an embodiment of the invention. Referring to FIG. 5, there is shown a start step 502, an end step 518, process steps 504, 506, 510, 512, and 514, and a decision step 508.

The choice of codebook $C_p$ may be important to determine the performance of the feedback system explained in FIG. 3. The flow chart in FIG. 5 may provide an exemplary means of implementing a codebook algorithm that may be suitable for any quantization resolution, that is number of matrices $P_i$ in the codebook $C_p = \{P_i\}$, and any number of receive and transmit antennas. Notwithstanding, a codebook may be designed that may minimize the following relationship:

$$C_P = \arg \min_C \left( E_P \left[ \min_{\hat{P} \in C} \| P - \hat{P} \|_F^2 \right] \right)$$

where $E_P\{.\}$ may be expectation with respect to P, P may be a random matrix of size $(N_{TX}-N_{RX})$ by r, where r may typically be $N_{RX}$ with random elements that may be uniformly distributed over the unitary space. $\|.\|_F$ may indicate the Frobenius matrix norm. The above relationship may indicate that the best choice of codebook, in some instances, may be the codebook $C_p$ comprising the matrices $P_q$, such that the expectation with respect to the random matrix P of the function $\|.\|_F$ may be minimized over all possible codebooks C. This may be achieved with the algorithm in FIG. 5.

In step 504, the codebook may be initialized. The codebook $C_p = \{P_i\}$ may, for example, be constructed from random matrices $P_i$. The initial choice of matrices $P_i$ may be immaterial. In step 506, a variable W may be initialized to a value 'not converged'. While W may not be set to a value 'converged' in decision step 508, the algorithm may compute the Voronoi Regions from the codebook $C_p$ in step 510. In step 510, the multidimensional space that may be spanned by the codebook $C_p$ may be partitioned into cells $R_i$, referred to as Voronoi regions, such that each cell $R_i$ represents a sub-space that may be closest, in some sense, to a particular matrix $P_i$, as illustrated in the following relationship:

$$R_i = \{P : \| P - P_i \|_F^2 \leq \| P - P_j \|_F^2, \forall j \neq i\}$$

In step 512, the codebook $C_p$ may be updated, based on the Voronoi regions that may be computed in step 510. For any given region Ri, a new matrix $P_i$ may be generated, as shown in the following relationship:

$$P_i = \arg \min_{X : X^H X = I} E_P\{\| P - X \|_F^2 \mid P \in R_i\}$$

where X may be a matrix of appropriate dimensions. A solution to the above optimization problem may be given by the following relationships:

$$P_i = U_A \cdot V_A^H$$

where $U_A$ and $V_A$ may be the left and right unitary matrices of the SVD of matrix A, such that $A = U_A \Sigma_A V_A^H$. Matrix A may be determined by the following relationship:

$$A = E_P\{P | P \in R_i\}$$

For the above equations, the expectation $E_P\{.\}$ with respect to some variable P, may be computed, for example, by sample averages of the sample space.

In step 514, a test for convergence may be applied to the codebook $C_p$ to verify whether the codebook may have converged to a stable set. For example, a convergence test may measure by how much each matrix $P_i$ may have changed between successive steps 512. If the change is less than a threshold value, convergence may be assumed to have been reached. In step 514, if the codebook has converged, the variable W may be set to value 'converged', otherwise the variable W may be set to value 'not converged'. If, in step 514, the variable W may have been set to 'converged', the loop comprising the steps 510, 512 and 514 may be exited in step 518 and the resulting codebook $C_p$ may be considered complete.

Figure 6:
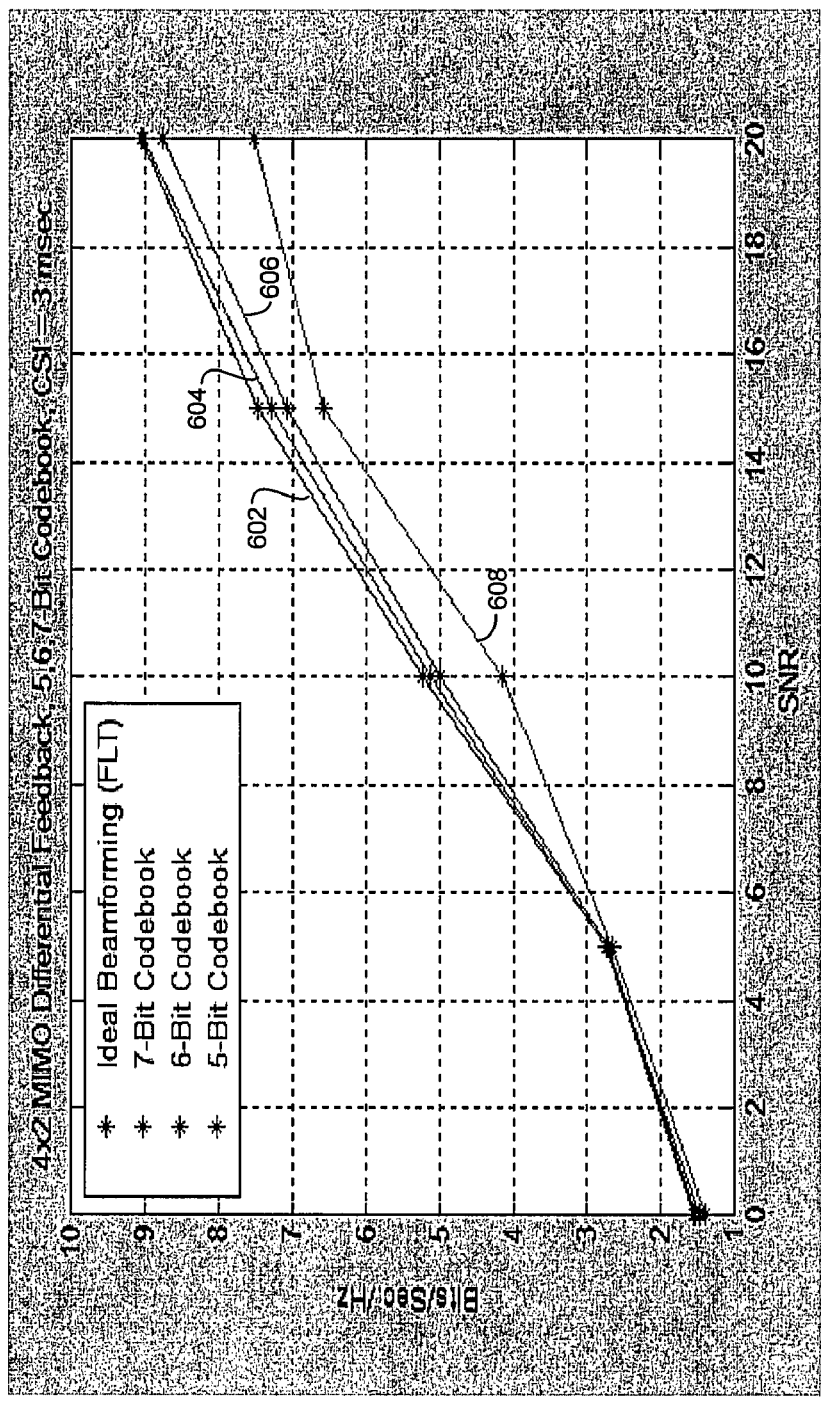
FIG. 6 is a performance line plot of an exemplary 4×2 MIMO system, in accordance with an embodiment of the invention.

FIG. 6 is a graph that illustrates a performance line plot of an exemplary 4×2 MIMO system, in accordance with an embodiment of the invention. Referring to FIG. 6, there is shown a spectral efficiency (Bits/sec/Hz) axis and an Signal-to-Noise (SNR) axis. There is also shown a line plot ideal beamforming 602, a line plot 7-bit codebook 604, a line plot 6-bit codebook 606 and a line plot 5-bit codebook 608.

For a four element codebook $C_q$ in a 4×2 MIMO system, 2 bits of feedback per channel update may be chosen. For the codebook $C_p$, with $N_p = 2^b$ elements, b may be chosen, for example, to be 3, 4 and/or 5 feedback bits, respectively. Together with the 2 bits of feedback required from the codebook $C_d$, a total of 5, 6 and/or 7 bits may be fed back to the transmitter, leading to the corresponding line plots 604, 606, and 608, respectively. The matrices $V_{k-1}$ and $U_{k-1}$ may, for example, be initialized by the matrices given in the following relationship:

$$V_{k-1} = \begin{bmatrix} 1 & 0 \\ 0 & 1 \\ 0 & 0 \\ 0 & 0 \end{bmatrix}, U_{k-1} = \begin{bmatrix} 0 & 0 \\ 0 & 0 \\ 1 & 0 \\ 0 & 1 \end{bmatrix}$$

From FIG. 6, it may be seen that 5-bit codebook may perform less well than the 6-bit codebook and the 7-bit codebook under certain assumptions, as illustrated by the line plot 5-bit codebook 608, the line plot 6-bit codebook 606 and the line plot 7-bit codebook 604. However, for certain simulation parameters, already the line plot 6-bit codebook 606 may illustrate a performance that may be close to complete CSI feedback as illustrated by the line plot ideal beamforming 602.

In accordance with an embodiment of the invention, a method and system for a delta quantizer for MIMO pre-coders with finite rate channel state information feedback may comprise quantizing a change in channel state information in a MIMO pre-coding system onto at least a first and a second codebook, each of which comprises one or more unitary matrices, using a cost function; and generating the at least first and second codebook based on at least the channel state information. The channel state information may be a matrix V and the cost function may be defined by the following relationship:

$$f(A) = \left( \frac{1}{N} \sum_{j=1}^{N} |a_{j,j}|^2 \right)$$

where A is a matrix of size N by N and $a_{ij}$ is element (i,j) of matrix A. One or more unitary matrices may be generated, as illustrated in FIG. 4, for the at least first codebook from at least a first set of matrices and a second set of matrices in step 422, whereby the first set of matrices may be generated from one or more Givens matrices in step 414 and the dynamic range of the at least first codebook may be modified by a step size in step 404. The resolution of the at least first codebook may be modified by adjusting the codebook cardinality in step 404. This may be achieved by modifying a set of angular levels. As illustrated in FIG. 5, from the at least second codebook, Voronoi regions may be generated in step 510 for the unitary matrices of the at least second codebook. Based on the Voronoi regions and the one or more unitary matrices, a set of matrices may be generated in step 512. This set of matrices may be modified into a set of unitary matrices that may become the at least second codebook, thereby updating the at least second codebook. As illustrated for FIG. 3, an index of an element of each of the at least first and second codebook onto which the change in channel state information is quantized may be transmitted from a receiver 304 to a transmitter 302 in the MIMO pre-coding system 300 via the feedback channel 320. A communication system comprising the MIMO pre-coding system 300 may comprise one or more transmit and receive antennas. The matrix V may be generated using Singular Value Decomposition (SVD) or Geometric Mean Decomposition (GMD). A matrix at a transmitter 302 of the MIMO pre-coding system may be linearly transformed with a combination of a plurality of the unitary matrices.

Another embodiment of the invention may provide a machine-readable storage, having stored thereon, a computer program having at least one code section executable by a machine, thereby causing the machine to perform the steps as described above for a method and system for a delta quantizer for MIMO pre-coders with finite rate channel state information feedback.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   quantizing a change in channel state information in a multiple input multiple output (MIMO) pre-coding system onto at least a first and a second codebook, each of which comprises one or more unitary matrices, using a cost function, wherein said cost function f(A) is defined by the following relationship:

$$f(A) = \left( \frac{1}{N} \sum_{j=1}^{N} |a_{j,j}|^2 \right)$$

where A is a matrix of size N by N and $a_{ij}$ is element (i,j) of matrix A; and
   generating said at least first and second codebook based on at least said channel state information.

2. The method according to claim 1, wherein said channel state information is a matrix V.

3. The method according to claim 2, comprising generating said matrix V using Singular Value Decomposition (SVD).

4. The method according to claim 2, comprising generating said matrix V using Geometric Mean Decomposition (GMD).

5. The method according to claim 1, comprising generating said one or more unitary matrices for said at least said first codebook from at least a first set of matrices and a second set of matrices.

6. The method according to claim 5, comprising generating said first set of matrices from one or more Givens matrices.

7. The method according to claim 1, comprising modifying a dynamic range of said at least said first codebook by modifying a step size of said at least said first codebook.

8. The method according to claim 1, comprising modifying a resolution of said at least said first codebook by modifying a cardinality of said at least said first codebook.

9. The method according to claim 8, comprising modifying said cardinality of said at least said first codebook by modifying a set of angular levels.

10. The method according to claim 1, comprising generating Voronoi regions from said at least said second codebook for said one or more unitary matrices of said at least said second codebook.

11. The method according to claim 10, comprising generating a set of matrices based on said Voronoi regions and said one or more unitary matrices.

12. The method according to claim 11, comprising updating said at least said second codebook by modifying said set of matrices into a new set of unitary matrices, where said new set of unitary matrices becomes said at least said second codebook.

13. The method according to claim 1, comprising transmitting an index of an element of each of said at least said first and said second codebook, onto which said change in channel state information is quantized, from a receiver to a transmitter in said MIMO pre-coding system.

14. The method according to claim 1, wherein a communication system comprising said MIMO pre-coding system comprises one or more transmit antennas and one or more receive antennas.

15. The method according to claim 1, comprising linearly transforming with a combination of a plurality of said unitary matrices, a matrix at a transmitter of said MIMO pre-coding system.

16. A system for processing communication signals, the system comprising:
one or more circuits in a MIMO pre-coding system, said one or more circuits enable:
quantizing a change in channel state information onto at least a first and a second codebook, each of which comprises one or more unitary matrices, using a cost function, wherein said cost function f(A) is defined by the following relationship:

$$f(A) = \left(\frac{1}{N}\sum_{j=1}^{N}|a_{j,j}|^2\right)$$

where A is a matrix of size N by N and $a_{ij}$ is element (i,j) of matrix A; and
generating said at least first and second codebook based on at least said channel state information.

17. The system according to claim 16, wherein said channel state information is a matrix V.

18. The system according to claim 17, wherein said one or more circuits generate said matrix V using Singular Value Decomposition (SVD).

19. The system according to claim 17, wherein said one or more circuits generate said matrix V using Geometric Mean Decomposition (GMD).

20. The system according to claim 16, wherein said one or more circuits generate said one or more unitary matrices for said at least said first codebook from at least a first set of matrices and a second set of matrices.

21. The system according to claim 20, wherein said one or more circuits generate said first set of matrices from one or more Givens matrices.

22. The system according to claim 16, wherein said one or more circuits modify a dynamic range of said at least said first codebook by modifying a step size of said at least said first codebook.

23. The system according to claim 16, wherein said one or more circuits modify a resolution of said at least said first codebook by modifying a cardinality of said at least said first codebook.

24. The system according to claim 23, wherein said one or more circuits modify said cardinality of said at least said first codebook by modifying a set of angular levels.

25. The system according to claim 24, wherein said one or more circuits update said at least said second codebook by modifying said set of matrices into a new set of unitary matrices, where said new set of unitary matrices becomes said at least said second codebook.

26. The system according to claim 16, wherein said one or more circuits generate Voronoi regions from said at least said second codebook for said one or more unitary matrices of said at least said second codebook.

27. The system according to claim 26, wherein said one or more circuits generate a set of matrices based on said Voronoi regions and said one or more unitary matrices.

28. The system according to claim 16, wherein said one or more circuits transmit an index of an element of each of said at least said first and said second codebook, onto which said change in channel state information is quantized, from a receiver to a transmitter in said MIMO pre-coding system.

29. The system according to claim 16, comprising one or more transmit antennas and one or more receive antennas.

30. The system according to claim 16, comprising linearly transforming with a combination of a plurality said unitary matrices, a matrix at a transmitter of said MIMO pre-coding system.

31. A method for processing communication signals, the method comprising:
quantizing a change in channel state information in a multiple input multiple output (MIMO) pre-coding system onto at least a first and a second codebook, each of which comprises one or more unitary matrices, using a cost function;
generating said at least first and second codebook based on at least said channel state information; and
modifying a dynamic range of said at least said first codebook by modifying a step size of said at least said first codebook.

32. The method according to claim 31, wherein said channel state information is a matrix V.

33. The method according to claim 32, comprising generating said matrix V using Singular Value Decomposition (SVD).

34. The method according to claim 32, comprising comprising generating said matrix V using Geometric Mean Decomposition (GMD).

35. The method according to claim 31, wherein said cost function f(A) is defined by the following relationship:

$$f(A) = \left(\frac{1}{N}\sum_{j=1}^{N} |a_{jj}|^2\right)$$

where A is a matrix of size N by N and $a_{ij}$ is element (i,j) of matrix A.

36. The method according to claim 31, comprising generating said one or more unitary matrices for said at least said first codebook from at least a first set of matrices and a second set of matrices.

37. The method according to claim 36, comprising generating said first set of matrices from one or more Givens matrices.

38. The method according to claim 31, comprising modifying a resolution of said at least said first codebook by modifying a cardinality of said at least said first codebook.

39. The method according to claim 38, comprising modifying said cardinality of said at least said first codebook by modifying a set of angular levels.

40. The method according to claim 31, comprising generating Voronoi regions from said at least said second codebook for said one or more unitary matrices of said at least said second codebook.

41. The method according to claim 40, comprising generating a set of matrices based on said Voronoi regions and said one or more unitary matrices.

42. The method according to claim 41, comprising updating said at least said second codebook by modifying said set of matrices into a new set of unitary matrices, where said new set of unitary matrices becomes said at least said second codebook.

43. The method according to claim 31, comprising transmitting an index of an element of each of said at least said first and said second codebook, onto which said change in channel state information is quantized, from a receiver to a transmitter in said MIMO pre-coding system.

44. The method according to claim 31, wherein a communication system comprising said MIMO pre-coding system comprises one or more transmit antennas and one or more receive antennas.

45. The method according to claim 31, comprising linearly transforming with a combination of a plurality of said unitary matrices, a matrix at a transmitter of said MIMO pre-coding system.

46. A system for processing communication signals, the system comprising:
one or more circuits in a MIMO pre-coding system, said one or more circuits enable:
quantizing a change in channel state information onto at least a first and a second codebook, each of which comprises one or more unitary matrices, using a cost function;
generating said at least first and second codebook based on at least said channel state information; and
modifying a dynamic range of said at least said first codebook by modifying a step size of said at least said first codebook.

47. The system according to claim 46, wherein said channel state information is a matrix V.

48. The system according to claim 47, wherein said one or more circuits generate said matrix V using Singular Value Decomposition (SVD).

49. The system according to claim 47, wherein said one or more circuits generate said matrix V using Geometric Mean Decomposition (GMD).

50. The system according to claim 46, wherein said cost function f(A) is defined by the following relationship:

$$f(A) = \left(\frac{1}{N}\sum_{j=1}^{N} |a_{jj}|^2\right)$$

where A is a matrix of size N by N and $a_{ij}$ is element (i,j) of matrix A.

51. The system according to claim 46, wherein said one or more circuits generate said one or more unitary matrices for said at least said first codebook from at least a first set of matrices and a second set of matrices.

52. The system according to claim 51, wherein said one or more circuits generate said first set of matrices from one or more Givens matrices.

53. The system according to claim 46, wherein said one or more circuits modify a resolution of said at least said first codebook by modifying a cardinality of said at least said first codebook.

54. The system according to claim 53, wherein said one or more circuits modify said cardinality of said at least said first codebook by modifying a set of angular levels.

55. The system according to claim 54, wherein said one or more circuits update said at least said second codebook by modifying said set of matrices into a new set of unitary matrices, where said new set of unitary matrices becomes said at least said second codebook.

56. The system according to claim 46, wherein said one or more circuits generate Voronoi regions from said at least said second codebook for said one or more unitary matrices of said at least said second codebook.

57. The system according to claim 56, wherein said one or more circuits generate a set of matrices based on said Voronoi regions and said one or more unitary matrices.

58. The system according to claim 46, wherein said one or more circuits transmit an index of an element of each of said at least said first and said second codebook, onto which said change in channel state information is quantized, from a receiver to a transmitter in said MIMO pre-coding system.

59. The system according to claim 46, comprising one or more transmit antennas and one or more receive antennas.

60. The system according to claim 46, comprising linearly transforming with a combination of a plurality said unitary matrices, a matrix at a transmitter of said MIMO pre-coding system.

61. A method for processing communication signals, the method comprising:
quantizing a change in channel state information in a multiple input multiple output (MIMO) pre-coding system onto at least a first and a second codebook, each of which comprises one or more unitary matrices, using a cost function;
generating said at least first and second codebook based on at least said channel state information; and
modifying a resolution of said at least said first codebook by modifying a cardinality of said at least said first codebook.

62. The method according to claim 61, wherein said channel state information is a matrix V.

63. The method according to claim 62, comprising generating said matrix V using Singular Value Decomposition (SVD).

64. The method according to claim 62, comprising generating said matrix V using Geometric Mean Decomposition (GMD).

65. The method according to claim 61, wherein said cost function f(A) is defined by the following relationship:

$$f(A) = \left(\frac{1}{N}\sum_{j=1}^{N}|a_{jj}|^2\right)$$

where A is a matrix of size N by N and $a_{ij}$ is element (i,j) of matrix A.

66. The method according to claim 61, comprising generating said one or more unitary matrices for said at least said first codebook from at least a first set of matrices and a second set of matrices.

67. The method according to claim 66, comprising generating said first set of matrices from one or more Givens matrices.

68. The method according to claim 61, comprising modifying a dynamic range of said at least said first codebook by modifying a step size of said at least said first codebook.

69. The method according to claim 61, comprising modifying said cardinality of said at least said first codebook by modifying a set of angular levels.

70. The method according to claim 61, comprising generating Voronoi regions from said at least said second codebook for said one or more unitary matrices of said at least said second codebook.

71. The method according to claim 70, comprising generating a set of matrices based on said Voronoi regions and said one or more unitary matrices.

72. The method according to claim 71, comprising updating said at least said second codebook by modifying said set of matrices into a new set of unitary matrices, where said new set of unitary matrices becomes said at least said second codebook.

73. The method according to claim 61, comprising transmitting an index of an element of each of said at least said first and said second codebook, onto which said change in channel state information is quantized, from a receiver to a transmitter in said MIMO pre-coding system.

74. The method according to claim 61, wherein a communication system comprising said MIMO pre-coding system comprises one or more transmit antennas and one or more receive antennas.

75. The method according to claim 61, comprising linearly transforming with a combination of a plurality of said unitary matrices, a matrix at a transmitter of said MIMO pre-coding system.

76. A system for processing communication signals, the system comprising:
one or more circuits in a MIMO pre-coding system, said one or more circuits enable:
quantizing a change in channel state information onto at least a first and a second codebook, each of which comprises one or more unitary matrices, using a cost function;
generating said at least first and second codebook based on at least said channel state information; and
modifying a resolution of said at least said first codebook by modifying a cardinality of said at least said first codebook.

77. The system according to claim 76, wherein said channel state information is a matrix V.

78. The system according to claim 77, wherein said one or more circuits generate said matrix V using Singular Value Decomposition (SVD).

79. The system according to claim 77, wherein said one or more circuits generate said matrix V using Geometric Mean Decomposition (GMD).

80. The system according to claim 76, wherein said cost function f(A) is defined by the following relationship:

$$f(A) = \left(\frac{1}{N}\sum_{j=1}^{N}|a_{jj}|^2\right)$$

where A is a matrix of size N by N and $a_{ij}$ is element (i,j) of matrix A.

81. The system according to claim 76, wherein said one or more circuits generate said one or more unitary matrices for said at least said first codebook from at least a first set of matrices and a second set of matrices.

82. The system according to claim 81, wherein said one or more circuits generate said first set of matrices from one or more Givens matrices.

83. The system according to claim 76, wherein said one or more circuits modify a dynamic range of said at least said first codebook by modifying a step size of said at least said first codebook.

84. The system according to claim 76, wherein said one or more circuits modify said cardinality of said at least said first codebook by modifying a set of angular levels.

85. The system according to claim 84, wherein said one or more circuits update said at least said second codebook by modifying said set of matrices into a new set of unitary matrices, where said new set of unitary matrices becomes said at least said second codebook.

86. The system according to claim 76, wherein said one or more circuits generate Voronoi regions from said at least said second codebook for said one or more unitary matrices of said at least said second codebook.

87. The system according to claim 86, wherein said one or more circuits generate a set of matrices based on said Voronoi regions and said one or more unitary matrices.

88. The system according to claim 76, wherein said one or more circuits transmit an index of an element of each of said at least said first and said second codebook, onto which said change in channel state information is quantized, from a receiver to a transmitter in said MIMO pre-coding system.

89. The system according to claim 76, comprising one or more transmit antennas and one or more receive antennas.

90. The system according to claim 76, comprising linearly transforming with a combination of a plurality said unitary matrices, a matrix at a transmitter of said MIMO pre-coding system.

91. A method for processing communication signals, the method comprising:
quantizing a change in channel state information in a multiple input multiple output (MIMO) pre-coding system onto at least a first and a second codebook, each of which comprises one or more unitary matrices, using a cost function;
generating said at least first and second codebook based on at least said channel state information;
modifying a resolution of said at least said first codebook by modifying a cardinality of said at least said first codebook ; and modifying said cardinality of said at least said first codebook by modifying a set of angular levels.

92. The method according to claim 91, wherein said channel state information is a matrix V.

93. The method according to claim 92, comprising generating said matrix V using Singular Value Decomposition (SVD).

94. The method according to claim 92, comprising generating said matrix V using Geometric Mean Decomposition (GMD).

95. The method according to claim 91, wherein said cost function f(A) is defined by the following relationship:

$$f(A) = \left(\frac{1}{N}\sum_{j=1}^{N}|a_{jj}|^2\right)$$

where A is a matrix of size N by N and $a_{ij}$ is element (i,j) of matrix A.

96. The method according to claim 91, comprising generating said one or more unitary matrices for said at least said first codebook from at least a first set of matrices and a second set of matrices.

97. The method according to claim 96, comprising generating said first set of matrices from one or more Givens matrices.

98. The method according to claim 91, comprising modifying a dynamic range of said at least said first codebook by modifying a step size of said at least said first codebook.

99. The method according to claim 91, comprising generating Voronoi regions from said at least said second codebook for said one or more unitary matrices of said at least said second codebook.

100. The method according to claim 99, comprising generating a set of matrices based on said Voronoi regions and said one or more unitary matrices.

101. The method according to claim 100, comprising updating said at least said second codebook by modifying said set of matrices into a new set of unitary matrices, where said new set of unitary matrices becomes said at least said second codebook.

102. The method according to claim 91, comprising transmitting an index of an element of each of said at least said first and said second codebook, onto which said change in channel state information is quantized, from a receiver to a transmitter in said MIMO pre-coding system.

103. The method according to claim 91, wherein a communication system comprising said MIMO pre-coding system comprises one or more transmit antennas and one or more receive antennas.

104. The method according to claim 91, comprising linearly transforming with a combination of a plurality of said unitary matrices, a matrix at a transmitter of said MIMO pre-coding system.

105. A system for processing communication signals, the system comprising:
one or more circuits in a MIMO pre-coding system, said one or more circuits enable:
quantizing a change in channel state information onto at least a first and a second codebook, each of which comprises one or more unitary matrices, using a cost function;
generating said at least first and second codebook based on at least said channel state information;
modifying a resolution of said at least said first codebook by modifying a cardinality of said at least said first codebook and
modifying said cardinality of said at least said first codebook by modifying a set of angular levels.

106. The system according to claim 105, wherein said channel state information is a matrix V.

107. The system according to claim 106, wherein said one or more circuits generate said matrix V using Singular Value Decomposition (SVD).

108. The system according to claim 107, wherein said one or more circuits generate said matrix V using Geometric Mean Decomposition (GMD).

109. The system according to claim 105, wherein said cost function f(A) is defined by the following relationship:

$$f(A) = \left(\frac{1}{N}\sum_{j=1}^{N}|a_{jj}|^2\right)$$

where A is a matrix of size N by N and $a_{ij}$ is element (i,j) of matrix A.

110. The system according to claim 105, wherein said one or more circuits generate said one or more unitary matrices for said at least said first codebook from at least a first set of matrices and a second set of matrices.

111. The system according to claim 110, wherein said one or more circuits generate said first set of matrices from one or more Givens matrices.

112. The system according to claim 105, wherein said one or more circuits modify a dynamic range of said at least said first codebook by modifying a step size of said at least said first codebook.

113. The system according to claim 112, wherein said one or more circuits update said at least said second codebook by modifying said set of matrices into a new set of unitary matrices, where said new set of unitary matrices becomes said at least said second codebook.

114. The system according to claim 105, wherein said one or more circuits generate Voronoi regions from said at least said second codebook for said one or more unitary matrices of said at least said second codebook.

115. The system according to claim 114, wherein said one or more circuits generate a set of matrices based on said Voronoi regions and said one or more unitary matrices.

116. The system according to claim 105, wherein said one or more circuits transmit an index of an element of each of said at least said first and said second codebook, onto which said change in channel state information is quantized, from a receiver to a transmitter in said MIMO pre-coding system.

117. The system according to claim 105, comprising one or more transmit antennas and one or more receive antennas.

118. The system according to claim 105, comprising linearly transforming with a combination of a plurality said unitary matrices, a matrix at a transmitter of said MIMO pre-coding system.

* * * * *